(12) United States Patent
Tu et al.

(10) Patent No.: US 11,392,238 B2
(45) Date of Patent: Jul. 19, 2022

(54) SMART MIRROR

(71) Applicants: K-TRONICS (SU ZHOU) TECHNOLOGY CO., LTD., Jiangsu (CN); BOE Technology Group Co., Ltd., Beijing (CN)

(72) Inventors: Chuang Tu, Beijing (CN); Zhenhua Ding, Beijing (CN); Cheng Yang, Beijing (CN); Kangjian Liu, Beijing (CN)

(73) Assignees: K-TRONICS (SU ZHOU) TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/767,235

(22) PCT Filed: Apr. 26, 2019

(86) PCT No.: PCT/CN2019/084663
§ 371 (c)(1),
(2) Date: May 27, 2020

(87) PCT Pub. No.: WO2020/215333
PCT Pub. Date: Oct. 29, 2020

(65) Prior Publication Data
US 2021/0232254 A1    Jul. 29, 2021

(51) Int. Cl.
*G06F 3/041* (2006.01)
(52) U.S. Cl.
CPC .................. *G06F 3/0416* (2013.01)

(58) Field of Classification Search
None
See application file for complete search history.

(56) References Cited

U.S. PATENT DOCUMENTS

| | | | |
|---|---|---|---|
| 2018/0032227 A1* | 2/2018 | Broxson | G06F 1/1605 |
| 2019/0154888 A1* | 5/2019 | Campbell | G06F 3/042 |
| 2019/0296497 A1* | 9/2019 | Chang | H01R 12/725 |
| 2020/0364023 A1* | 11/2020 | Dai | G06F 3/147 |

FOREIGN PATENT DOCUMENTS

| | | |
|---|---|---|
| CN | 103680589 A | 3/2014 |
| CN | 107004385 A | 8/2017 |
| CN | 206612477 A | 11/2017 |
| CN | 109074770 A | 12/2018 |
| CN | 208607639 U | 3/2019 |

OTHER PUBLICATIONS

Chinese Office Action dated Apr. 14, 2020 in related Chinese Application No. 201990000051.0.

* cited by examiner

*Primary Examiner* — Stephen T. Reed
(74) *Attorney, Agent, or Firm* — ArentFox Schiff LLP; Michael Fainberg

(57) ABSTRACT

A smart mirror is provided. The smart mirror includes: a mirror body, wherein a display component is arranged in the mirror body; a touch display screen; and a control circuit, which is in signal connection with the display component in the mirror body and the touch display screen respectively, wherein the control circuit is configured to control the display component in the mirror body to display a corresponding picture in response to an instruction input by a user on the touch display screen.

20 Claims, 7 Drawing Sheets

SMART MIRROR

The present application is a US National Stage of International Application No. PCT/CN2019/084663, filed Apr. 26, 2019, which is hereby incorporated by reference in its entirety.

FIELD

The present disclosure relates to the field of display, and particularly to a smart mirror.

BACKGROUND

In a mirror display product at present, a touch component is generally fit to the inside of a mirror surface; that is, the touch component is fit to a light emitting surface of a display component. When using the mirror display product, a user directly operates on the mirror surface, and fingerprints and stains are left on the mirror surface, thereby affecting the display effect of the mirror surface. In addition, when an operator performs a touch operation, a displayed picture is shielded, which affects the showing effect. Touch operation steps of the operator are directly shown to a customer, with poor secrecy.

SUMMARY

An embodiment of the present disclosure provides a smart mirror. The smart mirror includes: a mirror body, wherein a display component is arranged in the mirror body; a touch display screen; and a control circuit, which is in signal connection with the display component in the mirror body and the touch display screen respectively, wherein the control circuit is configured to control the display component in the mirror body to display a corresponding picture in response to an instruction input by a user on the touch display screen.

In a possible implementation, in the above smart mirror in accordance with the embodiment of the present disclosure, the control circuit is arranged in the touch display screen, in the display component, or in the mirror body.

In a possible implementation, in the above smart mirror in accordance with the embodiment of the present disclosure, the touch display screen and the mirror body are in signal connection through a first cable.

In a possible implementation, in the above smart mirror in accordance with the embodiment of the present disclosure, the first cable has an HDMI male at one end, and a Type-C plug at the other end; the mirror body has an HDMI female into which the HDMI male is plugged; and the touch display screen has a Type-C interface into which the Type-C plug is plugged.

In a possible implementation, in the above smart mirror in accordance with the embodiment of the present disclosure, the touch display screen has a housing, and both the Type-C plug and the Type-C interface are fixed in the housing.

In a possible implementation, in the above smart mirror in accordance with the embodiment of the present disclosure, the mirror body comprises a mirror component and a rear case fixed to the back of the mirror component, and both the display component and the HDMI female are located in an accommodating space between the mirror component and the rear case.

In a possible implementation, in the above smart mirror in accordance with the embodiment of the present disclosure, the rear case is provided with a first opening, and the HDMI male of the first cable is fixed to the outer side of the rear case, and is plugged into the HDMI female through the first opening.

In a possible implementation, in the above smart mirror in accordance with the embodiment of the present disclosure, the HDMI male of the first cable is provided with first fixing members at two outer ends respectively; the first fixing members are provided with first screw holes to cooperate with first screw columns located at an outer side of the rear case; and the first fixing members are fixed to the first screw columns by screws.

In a possible implementation, in the above smart mirror provided in the embodiment of the present disclosure, the HDMI female is provided with three second fixing members at outer sides; the second fixing members are provided with second screw holes to cooperate with the second screw columns at an inner side of the rear case, and the second fixing members are fixed to the second screw columns by screws.

In a possible implementation, in the above smart mirror in accordance with the embodiment of the present disclosure, the smart mirror further includes: an HDMI adapter in signal connection with the display component, and a second cable; the HDMI adapter is provided with an HDMI plug; one end of the second cable is the HDMI female; the other end of the second cable is an HDMI plug to be plugged into the HDMI adapter; and the second cable further includes a first lead configured to connect the HDMI female and the HDMI plug.

In a possible implementation, in the above smart mirror in accordance with the embodiment of the present disclosure, the mirror body further includes a strip light component; and the second cable further includes a first connector to be plugged into a control board of the strip light component, and a second lead configured to connect the first connector and the HDMI female.

In a possible implementation, in the above smart mirror in accordance with the embodiment of the present disclosure, the strip light component is a ring frame structure arranged outside the display component, and the display component is in a central area of the mirror body.

In a possible implementation, in the above smart mirror in accordance with the embodiment of the present disclosure, the mirror body further includes a camera component; and the second cable further includes: a second connector in signal connection with the camera component, and a third lead configured to connect the second connector and the HDMI female.

In a possible implementation, in the above smart mirror in accordance with the embodiment of the present disclosure, the camera component is arranged in an area between the display component and the strip light component.

In a possible implementation, in the above smart mirror in accordance with the embodiment of the present disclosure, the camera component is arranged above the display component, and is spaced from the display component and the strip light component by a set distance.

In a possible implementation, in the above smart mirror in accordance with the embodiment of the present disclosure, the mirror body further includes a power component, and the power component is in signal connection with the display component, the HDMI adapter, the strip light component and the camera component respectively; the second cable further includes: a third connector in signal connection with the power component, and a fourth lead configured to connect the third connector and the HDMI female.

In a possible implementation, in the above smart mirror in accordance with the embodiment of the present disclosure, the mirror body further includes an external power socket, and the external power socket is in signal connection with the power component.

In a possible implementation, in the above smart mirror in accordance with the embodiment of the present disclosure, the rear case of the mirror body is provided with a second opening, and the external power socket is fixed to the outer side of the rear case through the second opening.

In a possible implementation, in the above smart mirror in accordance with the embodiment of the present disclosure, the mirror body and the touch display screen are respectively provided with wireless interfaces, and the wireless interface on the mirror body is in signal connection with the display component and configured for wireless communication with the touch display screen.

DETAILED DESCRIPTION

Figure 1:
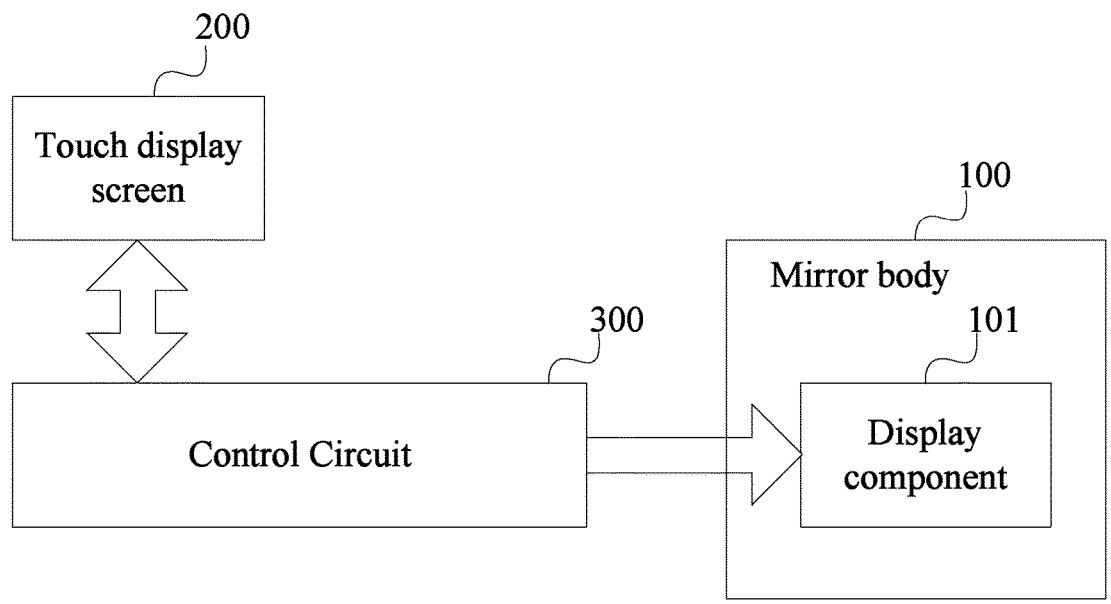
FIG. 1 is a schematic structural diagram of a smart mirror in accordance with at least some embodiments of the present disclosure.

The make the object, technical solutions and advantages of the present disclosure more apparent, specific implementations of a smart mirror in accordance with embodiments of the present disclosure are described in detail below in conjunction with the accompanying drawings. It should be understood that the preferred embodiments described below are only used for describing and explaining the present disclosure, instead of limiting the present disclosure. Moreover, the embodiments in the present disclosure and the features in the embodiments can be combined with each other without conflict. It should be noted that the sizes and shapes in the drawings do not reflect the true scale of the smart mirror, and are merely intended to schematically illustrate the present disclosure. Furthermore, same or similar reference numerals throughout represent same or similar elements or elements having same or similar functions.

A smart mirror in accordance with an embodiment of the present disclosure, as shown in FIG. 1, may include: a mirror body 100, wherein a display component 101 is arranged in the mirror body 100; a touch display screen 200; and a control circuit 300, wherein the control circuit 300 is in signal connection with the display component 101 in the mirror body 100 and the touch display screen 200 respectively, the control circuit 300 is configured to control the display component 101 in the mirror body 100 to display a corresponding picture in response to an instruction input by a user on the touch display screen 200.

Specifically, in the above smart mirror in accordance with the embodiment of the present disclosure, the touch display screen 200 external to the mirror body 100 is used to control the picture displayed by the display component 101 in the mirror body 100. Thus, inputting an instruction on the touch display screen display 200 by the user may avoid a direct operation on a mirror surface of the mirror body 100, so that the mirror surface that shows the picture is kept clean and bright. Moreover, a customer may see from the display component 101 in the mirror body 100 a complete showed picture, without interference information, that is not blocked by the user, which improves customer satisfaction. The control circuit 300 may control the display component 101 in the mirror body 100 to display the same picture as the touch display screen 200, i.e. achieving dual-screen display by the control circuit 300. Alternatively, the control circuit 300 may also control the display component 101 of the mirror body 100 to display a different picture from the touch display screen 200, i.e. achieving split-screen display. For example, operation information is displayed only on the touch display screen 200, while the display component 101 in the mirror body 100 displays a picture selected by the user, so that a privacy operation such as entering a password may be concealed, to avoid showing the operation to the customer through the mirror body 100, thus improving the operation secrecy. Moreover, the same control circuit 300 is used to control the display component 101 of the mirror body 100 and the touch display screen 200, which may facilitate maintenance and upgrade.

Figure 2:
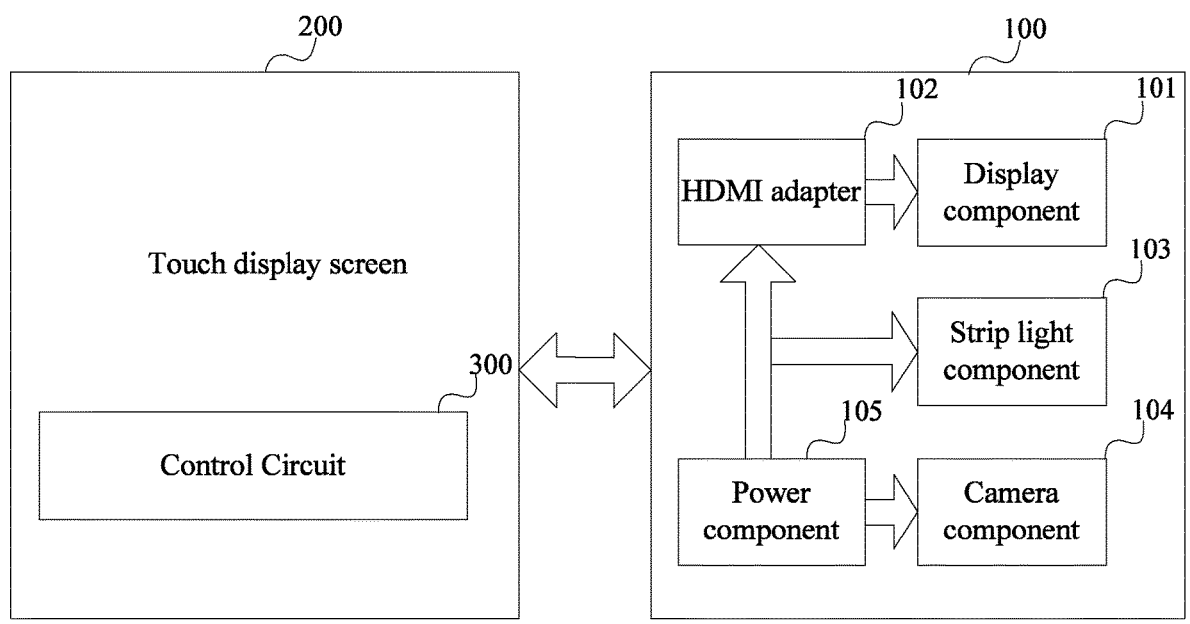
FIG. 2 is a schematic diagram of a detailed structure of a smart mirror in accordance with at least some embodiments of the present disclosure.

Optionally, in the above smart mirror in accordance with the embodiment of the present disclosure, as shown in FIG. 2, the control circuit 300 may be arranged in the touch display screen 200, or in the mirror body 100, or in the display component 101, or be a control center or the like independent of the touch display screen 200 and the mirror body 100.

Specifically, in an embodiment of the present disclosure, the control circuit 300 is arranged in the touch display screen 200. That is, the touch display screen 200 serves as a touch display panel with an operating system; for example, a mobile terminal such as a mobile phone or a pad may be used as the user's operation panel, while the display component 101 for showing pictures remains in the mirror body 100. In this way, all operations may be performed in the external operating system, to control according to the need of the content to be shown signal to transmit from the external operation panel of the user to the display component 101 of the mirror body 100, to show the content to be shown to the customer through the display component 101.

Specifically, an operator may perform operations through the external operation panel of the user, so that the mirror body 100 showing pictures may be kept clean and bright, and the customer may see from the mirror body 100 a complete showed picture without interference information, which improves customer satisfaction. Operation information is displayed only on the user's operation panel, and a privacy operation such as entering a password may be concealed, to avoid showing the operation to the customer, thus improving the operation secrecy. In addition, using the control circuit 300 arranged in the external operation panel of the user to control the display component 101 of the mirror body 100 may facilitate maintenance and upgrade.

It is to be noted that a mirror component is arranged in the mirror body 100. The mirror component is generally a mirror component with a set light transmittance and reflectance formed by a process such as coating or the like on a front or back surface of a glass substrate. The light transmittance of the mirror component from a direction pointed to the glass surface is generally around 30%, and the corresponding light reflectance is generally around 70%, which may achieve both a mirror effect on the glass surface and a display effect of the display component 101.

Optionally, in the above smart mirror in accordance with the embodiment of the present disclosure, the mirror body 100 and the touch display screen 200 may be respectively provided with wireless interfaces, and the wireless interface on the mirror body 100 is in signal connection with the display component 101 and configured for wireless communication with the touch display screen 200.

Figure 3:
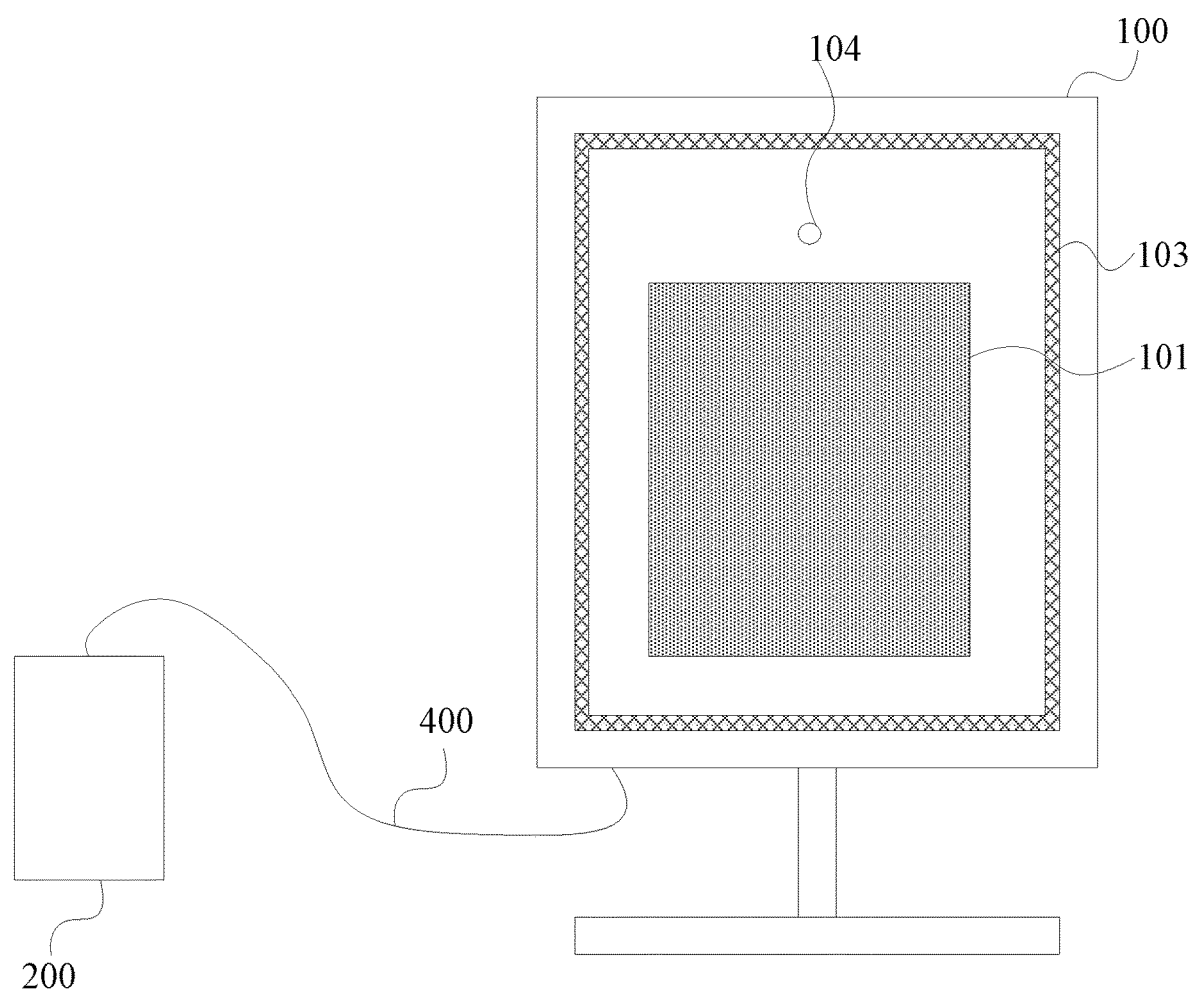
FIG. 3 is an external schematic diagram of a smart mirror in accordance with at least some embodiments of the present disclosure.

Alternatively, optionally, in the above smart mirror in accordance with the embodiment of the present disclosure, as shown in FIG. 3, the touch display screen 200 and the mirror body 100 may be in signal connection through a first cable 400.

Specifically, in the above smart mirror in accordance with the embodiment of the present disclosure, the touch display screen 200 is communicated with the mirror body 100 in a wired manner, i.e. by the first cable 400, which is beneficial to one-to-one control of the mirror body 100 by the touch display screen 200. This may reduce the cost of management, verification and the like and the risk of being attacked by other devices.

Figure 4:
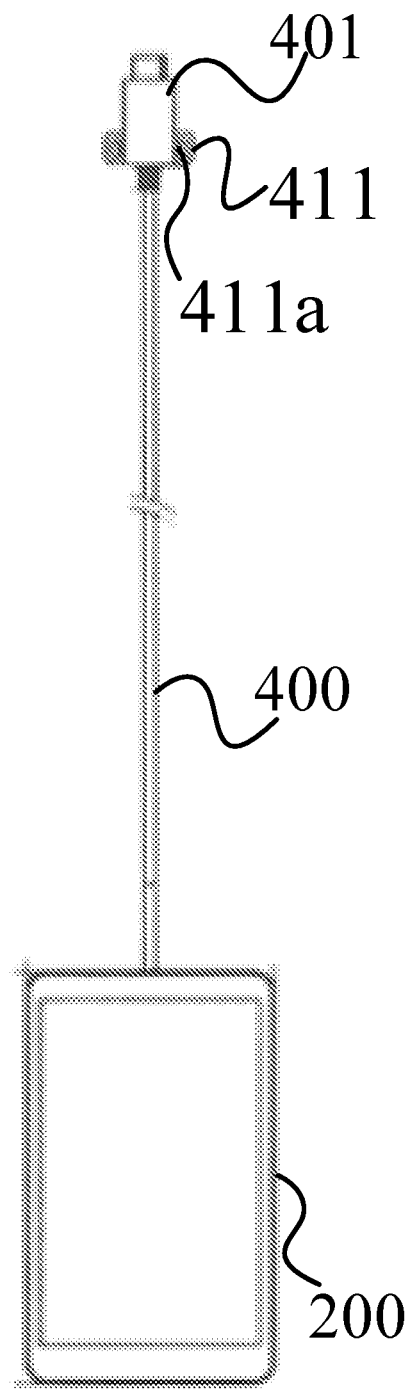
FIG. 4 is a schematic diagram of a touch display screen of a smart mirror in accordance with at least some embodiments of the present disclosure after a first cable is plugged therein.

FIG. 4 is a schematic diagram after the first cable 400 is plugged into the touch display screen 200.

Figure 5:
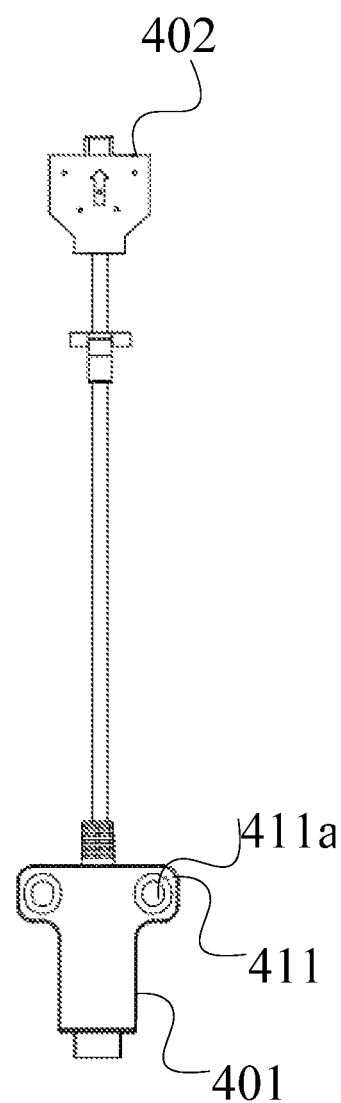
FIG. 5 is a schematic diagram of a first cable in a smart mirror in accordance with at least some embodiments of the present disclosure.

Optionally, in the above smart mirror in accordance with the embodiment of the present disclosure, as shown in FIGS. 4 and 5, the first cable 400 generally has an HDMI male 401 at one end, and generally has a Type-C plug 402 at the other end.

Correspondingly, the mirror body 100 may have an HDMI female 501, the HDMI female 501 is configured such that the HDMI male 401 is plugged into the HDMI female 501. The touch display screen 200 may have a Type-C interface into which the Type-C plug 402 is plugged, the Type-C interface, served as an overall external interface of the touch display screen 200, is generally in signal connection with the control circuit 300 through an internal line inside the touch display screen 200.

Specifically, the Type-C interface and plug are a hardware interface specification for a universal serial bus (USB). Highlights of the Type-C interface are a thinner design, a faster transmission speed (up to 10 Gbps) and more powerful power transmission (up to 100 W). The characteristic of the Type-C double-sided pluggable interface is supporting plugging of a USB interface on any of two sides, which completely solves the worldwide problem of "USB plugging uncertainty", as plugging is allowed on any of front and back sides. The HDMI (High Definition Multimedia Interface) is a fully digital video and sound transmitting interface that may transmit uncompressed audio and video signals. The HDMI may transmit audio and video signals simultaneously. As audio and video signals use the same cable, the installation difficulty of the system lines is greatly simplified.

Specifically, in the above smart mirror in accordance with the embodiment of the present disclosure, the HDMI male 401 to be plugged into the mirror body 100 is arranged at one end of the first cable 400, to achieve video and audio transmission simultaneously, and its pin definitions are different from those of a standard HDMI interface. The Type-C plug 402 to be plugged into the touch display screen 200 is provided at the other end of the first cable 400, to achieve conversions of different data interface types between the touch display screen 200 and the mirror body 100, and its pin definitions are different from those of a standard Type-C interface. The touch display screen 200 can be communicated with the mirror body 100 by the first cable 400, and the touch display screen 200 may transmit a picture to be displayed to the display component 101 of the mirror body 100 through the first cable 400, so as to control the showed picture.

Optionally, in the above smart mirror in accordance with the embodiment of the present disclosure, as shown in FIG. 4, the touch display screen 200 has a housing, and both the Type-C plug 402 and the Type-C interface are fixed in the housing. Thus, after the first cable 400 is plugged into the touch display screen 200, only the line and the HDMI male 401 of the first cable 400 are exposed, and the Type-C plug 402 and Type-C interface are located within the touch display screen 200, to firmly secure the first cable 400 and the touch display screen 200, and the first cable 400 and the touch display screen 200 may be prevented from being plugged and unplugged arbitrarily when the smart mirror is placed in a public environment.

Figure 6A:
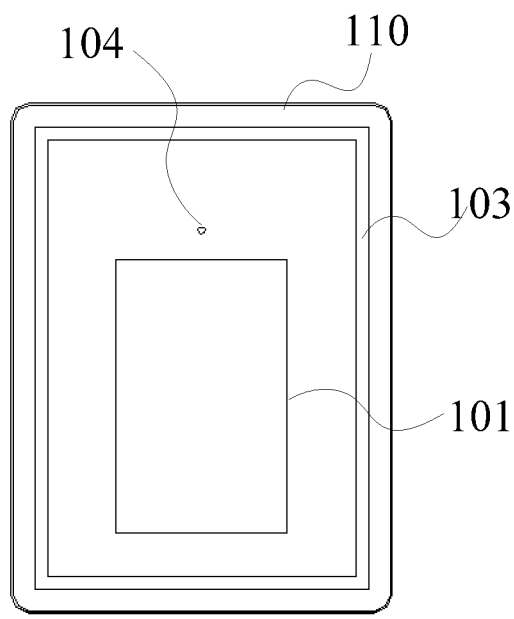
FIG. 6*a* is a schematic front view of a mirror body in a smart mirror in accordance with at least some embodiments of the present disclosure.
Figure 6B:
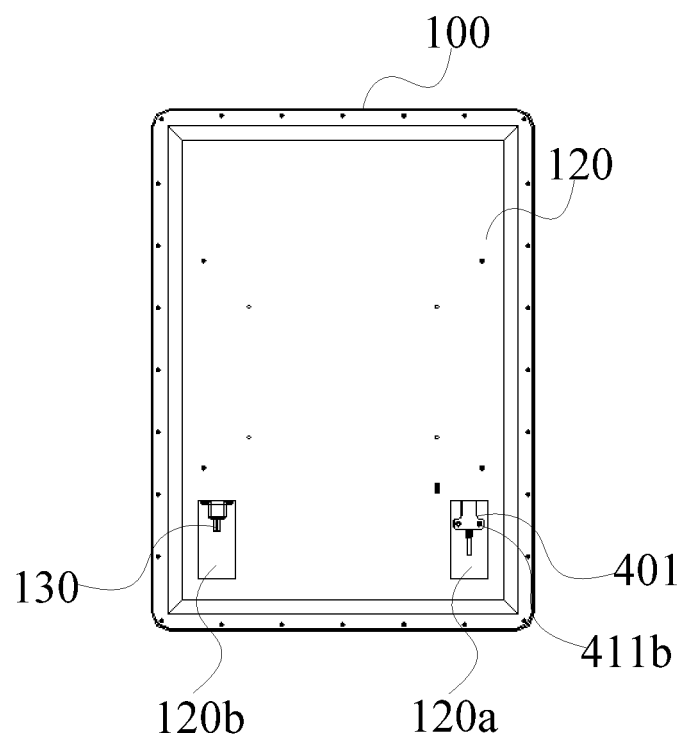
FIG. 6*b* is a schematic back view of a mirror body in a smart mirror in accordance with at least some embodiments of the present disclosure.

Specifically, in the above smart mirror in accordance with the embodiment of the present disclosure, the mirror body 100 has a mirror component 110 (as shown in a front schematic view of the mirror body in FIG. 6a), and a rear case 120 fixed to the back of the mirror component (as shown in a back schematic view of the mirror body in FIG. 6b), wherein the rear case 120 and the mirror component 110 are generally fixed by screws (black dots in FIG. 6b represent screws), and both the display component 101 and the HDMI female 501 are located in an accommodating space between the mirror component 110 and the rear case 120, and functional components included in the mirror body 100 are hidden on the rear side of the mirror component 110, to ensure that the mirror component 110 viewed from the front of the mirror body is a complete mirror surface.

Optionally, in the above smart mirror in accordance with the embodiment of the present disclosure, as shown in FIG. 6b, the rear case 120 has a first opening 120a, and the HDMI male 401 of the first cable 400 is fixed to the outer side of the rear case 120, and is plugged into the HDMI female 501 (the HDMI female 501 is not shown in FIG. 6b) through the first opening 120a. The connecting between the first cable 400 and the first opening 120a on the back of the mirror body 100 is beneficial to the integrity of viewing from the front of the mirror body 100.

Optionally, in the above smart mirror in accordance with the embodiment of the present disclosure, as shown in FIGS. 4 and 5, the HDMI male 401 of the first cable 400 has first fixing members 411 at two outer ends respectively; the first fixing members 411 have first screw holes 411a to cooperate with first screw columns 411b located at an outer side of the rear case 120, as shown in FIG. 6b; and the first fixing members 411 are fixed to the first screw columns 411b by screws. Fixing the first cable 400 to the rear case 120 of the mirror body 100 by screws may prevent the first cable 400 and the mirror body 100 from being plugged and unplugged arbitrarily when the smart mirror is placed in a public environment.

Figure 7:
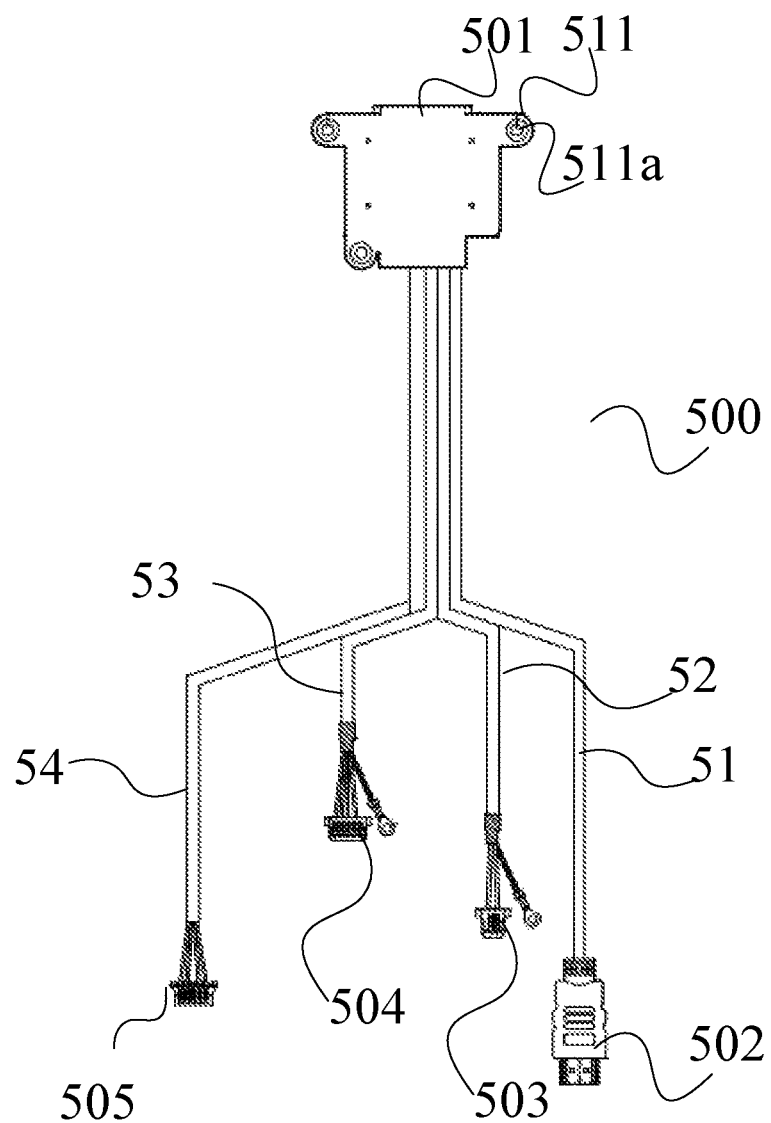
FIG. 7 is a schematic diagram of a second cable in a smart mirror in accordance with at least some embodiments of the present disclosure.

Optionally, in the above smart mirror in accordance with the embodiment of the present disclosure, as shown in FIG. 7, a second cable 500 may also be used for signal connection within the mirror body 100, and one end of the second cable 500 is an HDMI female 501; that is, the HDMI male 401 of the first cable 400 is plugged into one end of the second cable 500.

Specifically, in the above smart mirror in accordance with the embodiment of the present disclosure, the components in the mirror body 100 can be in signal connection through the second cable 500 to achieve signal transmission between the components with different data interface types and the touch display screen 200. The HDMI female 501 of the second cable 500 is an external signal interface of the mirror body 100, and its pin definitions are different from those of a standard HDMI. The components are not limited to a camera component, a power component, etc.

Optionally, in the above smart mirror in accordance with the embodiment of the present disclosure, as shown in FIG. 7, the HDMI female 501 has three second fixing members 511 at outer sides; the second fixing members 511 have second screw holes 511a to cooperate with the second screw columns (not shown) at an inner side of the rear case 120, and the second fixing members 511 are fixed to the second screw columns by screws.

Optionally, in the above smart mirror in accordance with the embodiment of the present disclosure, as shown in FIG. 2, the mirror body 100 may further include an HDMI adapter 102 in signal connection with the display component 101, and the HDMI adapter has a HDMI plug.

As shown in FIG. 7, the second cable 500 may further include: an HDMI plug 502 to be plugged into the HDMI adapter 102, and a first lead 51 configured to connect the HDMI female 501 and the HDMI plug 502.

Specifically, in the above smart mirror in accordance with the embodiment of the present disclosure, the HDMI plug 502 of the second cable 500 is plugged into the HDMI adapter 102, so that a HDMI video signal of the control circuit 300 may be transmitted to the display component 101 through the first cable 400 and the second cable 500, to control the display component 101 by the control circuit 300. The pin definitions of the HDMI plug 502 are different from those of the standard HDMI, and some pins are adjusted.

Optionally, in the above smart mirror in accordance with the embodiment of the present disclosure, as shown in FIG. 2, a strip light component 103 may also be included in the mirror body 100. And as shown in FIG. 7, the second cable 500 may further include: a first connector 503 to be plugged into a control board of the strip light component 103, and a second lead 52 configured to connect the first connector 503 and the HDMI female 501.

Specifically, in the above smart mirror in accordance with the embodiment of the present disclosure, the display component 101 is in a central area of the mirror body 100. The strip light component 103 is generally arranged around the display component 101. As shown in FIG. 6a, it is a closed ring design; that is, the strip light component 103 is a ring frame structure arranged outside the display component 101, and the strip light component 103 as a light supplement lamp can meet the customer's needs of make-up, trial, skin beauty and the like. The first connector 503 of the second cable 500 is plugged into the control board of the strip light component 101, so that a control signal of the control circuit 300 may be transmitted to the strip light component 103 through the first cable 400 and the second cable 500, to control the strip light component 103 by the control circuit 300. The first connector 503 is generally a 2 pin connector and is dedicated to IIC signals.

Optionally, in the above smart mirror in accordance with the embodiment of the present disclosure, as shown in FIG. 2, a camera component 104 may also be included in the mirror body 100. And as shown in FIG. 7, the second cable 500 may further include: a second connector 504 in signal connection with the camera component 104, and a third lead 53 configured to connect the second connector 504 and the HDMI female 501.

Specifically, in the above smart mirror in accordance with the embodiment of the present disclosure, the camera component 104 is generally arranged above the display component 101 and within the ring of the strip light component 103. As shown in FIG. 6a, the camera component 104 is arranged in an area between the display component 101 and the strip light component 103. When the camera component 104 is turned on, the camera component 104 is controlled by the control circuit 300 to transmit pictures in real time to the display component 101 for display to meet the customers' needs of photography, make-up, and the like. In addition, to obtain better photographed pictures, the camera component 104 is generally arranged above the display component 101, and is spaced from the display component 101 and the strip light component 103 by a set distance. The second connector 504 of the second cable 500 is plugged into the camera component 104, so that a control signal of the control circuit 300 may be transmitted to the camera component 104 through the first cable 400 and the second cable 500, to control the camera component 104 by the control circuit 300. The second connector 504 is generally a 5-pin connector and is used for transmitting USB signals.

Optionally, in the above smart mirror in accordance with the embodiment of the present disclosure, as shown in FIG. 2, a power component 105 may also be included in the mirror body 100, and the power component 105 is in signal connection with the display component 101, the HDMI adapter 102, the strip light component 103 and the camera component 104 respectively. And as shown in FIG. 7, the second cable 500 may further include: a third connector 505 in signal connection with the power component 105, and a fourth lead 54 configured to connect the third connector 505 and the HDMI female 501.

Specifically, in the above smart mirror in accordance with the embodiment of the present disclosure, the power component 105 may supply power to all components in the mirror body 100, and may also supply power to the touch display screen 200. The third connector 505 of the second cable 500 is plugged into the power component 105, and the power component 105 may supply power to the components in the touch display screen display 200 through the first cable 400 and the second cable 500. The third connector 505 is generally a 5pin connector, connected to a 5V power supply.

Optionally, in the above smart mirror in accordance with the embodiment of the present disclosure, as shown in FIG. 6b, the mirror body 100 may further include an external power socket 130, and the external power socket 130 is in signal connection with the power component 105.

Specifically, in the above smart mirror provided in the embodiment of the present disclosure, the external power socket 130 is connected to the power component 105, so that an external AC signal may be transmitted to the power component 105, and after voltage conversion by the power component 105, power is supplied to other components in smart mirror.

Optionally, in the above smart mirror in accordance with the embodiment of the present disclosure, as shown in FIG. 6b, the rear case 120 of the mirror body 100 may have a second opening 120b, and the external power socket 130 is fixed to the outer side of the rear case 120 through the second opening 120b to facilitate to connect to the external power supply.

Figure 8:
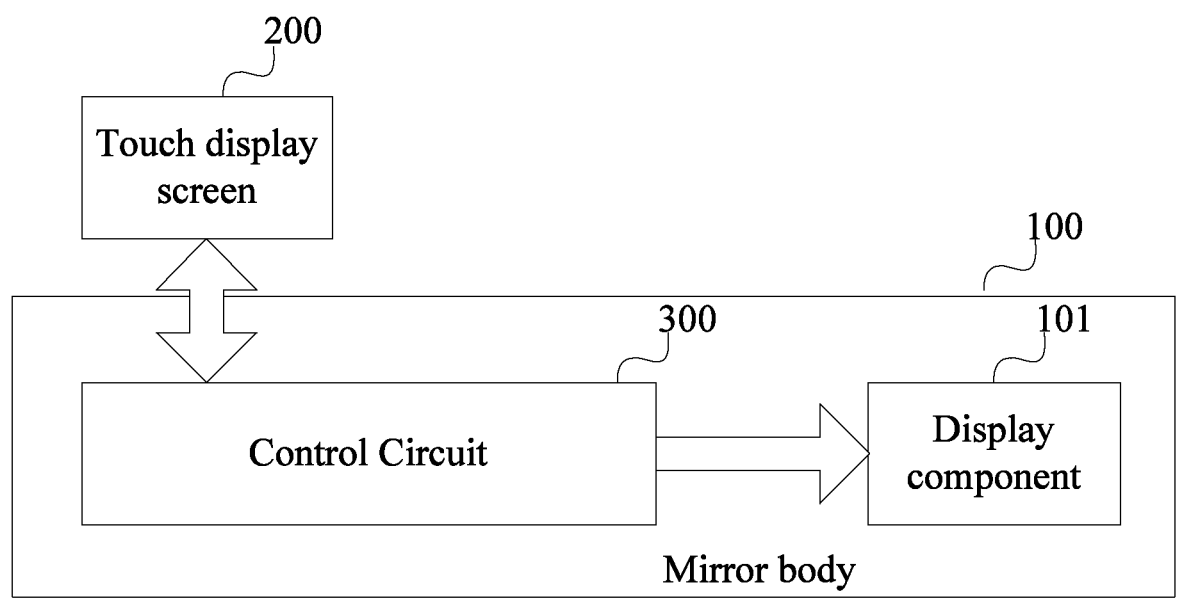
FIG. 8 is another schematic structural diagram of a smart mirror in accordance with at least some embodiments of the present disclosure.

Optionally, in the above smart mirror in accordance with the embodiment of the present disclosure, as shown in FIG. 8, the control circuit 300 may also be arranged in the mirror body 100. The control circuit 300 is in signal connection with the display component 101, or the control circuit 300 is arranged in the display component 101; that is, the control circuit 300 serves as a part of the control circuit board of the display component 101.

Alternatively, in the above smart mirror in accordance with the embodiment of the present disclosure, the touch display screen 200 may also be located on the mirror body 100; that is, different functions may be configured in the mirror body 100 in a split-screen manner; for example, two areas may be arranged under the mirror component, wherein a first area is relatively small, located at a corner of the mirror, and used to arrange the touch display screen 200, and the second area is relatively large, located in the middle of the mirror, and used to arrange the display component 101. Thus, the operator operates in the second area without affecting a picture shown in the first area. As another example, the touch display screen 200 may be arranged on the back of the mirror component; that is, the display component 101 and the touch display screen 200 are respectively located on different surfaces of the mirror body 100, so that the operator may operate on the back of the mirror body 100 without affecting a picture shown on the front surface.

Optionally, in the above smart mirror in accordance with the embodiment of the present disclosure, a display functional component and a touch functional component in the touch display screen 200 may be controlled by mutually independent control circuit boards.

Specifically, in the above smart mirror in accordance with the embodiment of the present disclosure, the touch functional component may be attached to a light emitting side of the display functional component in the touch display screen 200, and signal transmission between the control circuit 300 and a control chip of the display functional component and signal transmission between the control circuit and a control chip of the touch function component are performed through independent lines respectively. This is conducive to equipment maintenance.

Optionally, in the above smart mirror in accordance with the embodiment of the present disclosure, the touch functional component in the touch display screen 200 may also be embedded in the display functional component, and signal transmission between the control circuit 300 and the control chips of the control functional component and the touch functional component is performed through a set of lines, which may simplify the wiring.

Specifically, in the above smart mirror in accordance with the embodiment of the present disclosure, the display component 101 and the display functional component in the touch display screen 200 may specifically be implemented by using a liquid crystal display panel, or may also be implemented by using an organic electroluminescent display panel, which is not limited here. The touch functional components may be implemented by mutual-capacitive touch, self-capacitive touch, resistive touch, or the like, which is not limited here.

The above smart mirror in accordance with the embodiment of the present disclosure, the touch display screen is arranged external to the mirror body, to control a picture displayed by the display component on the mirror body. Thus, inputting an instruction on the touch display screen display by the user may avoid a direct operation on a mirror surface of the mirror body, so that the mirror surface that shows the picture is kept clean and bright. Moreover, a customer may see from the display component on the mirror body a complete showed picture without interference information that is not blocked by the user, which improves customer satisfaction. The control circuit may control the display component on the mirror body to display the same picture as the touch display screen, i.e. achieving dual-screen display by the control circuit. Alternatively, the control circuit may also control the display component of the mirror body to display a different picture from the touch display screen, i.e. achieving split-screen display. For example, operation information is displayed only on the touch display screen, while the display component on the mirror body displays a picture selected by the user, so that a privacy operation such as entering a password may be concealed, to avoid showing the operation to the customer through the mirror body, thus improving the operation secrecy. Moreover, the same control circuit is used to control the display component of the mirror body and the touch display screen, which may facilitate maintenance and upgrade.

Evidently those skilled in the art can make various modifications and variations to the invention without departing from the spirit and scope of the invention. Thus the invention is also intended to encompass these modifications and variations therein as long as these modifications and variations come into the scope of the claims of the invention and their equivalents.

The invention claimed is:

1. A smart mirror, comprising:
   a mirror body comprising:
     a mirror component,
     a rear case fixed to a back of the mirror component, and
     a display component in an accommodating space between the mirror component and the rear case;
   a touch display screen, arranged external to the mirror body, comprising:
     a display functional component, and
     a touch functional component attached to a light emitting side of the display functional component;
     wherein the display functional component is configured to present a first picture directly to a user; and
     the touch functional component is configured to receive a touch operation of a user; and
   a control circuit, which is in signal connection with the display component in the mirror body and the touch display screen respectively, wherein the control circuit is configured to control the display component in the mirror body to display a second picture in response to the touch operation of the user received by the touch functional component, and the second picture displayed by the display component is presented to a user through the mirror component;
   wherein the first picture and the second picture are same or different.

2. The smart mirror according to claim 1, wherein the control circuit is arranged in the touch display screen, in the display component, or in the mirror body.

3. The smart mirror according to claim 2, wherein the touch display screen and the mirror body are in signal connection through a first cable.

4. The smart mirror of claim 3, wherein the first cable has a High-Definition Multimedia Interface (HDMI) male at one end, and a Type-C plug at the other end;
the mirror body has an HDMI female into which the HDMI male is to be plugged; and the touch display screen has a Type-C interface into which the Type-C plug is to be plugged.

5. The smart mirror of claim 4, wherein the touch display screen has a housing, and both the Type-C plug and the Type-C interface are fixed in the housing.

6. The smart mirror according to claim 4, wherein the HDMI female is in the accommodating space between the mirror component and the rear case.

7. The smart mirror of claim 6, wherein the rear case is provided with a first opening, and the HDMI male of the first cable is fixed to an outer side of the rear case, and is plugged into the HDMI female through the first opening.

8. The smart mirror according to claim 7, wherein the HDMI male of the first cable is provided with first fixing members at two outer ends respectively; the first fixing members are provided with first screw holes to cooperate with first screw columns at an outer side of the rear case; and the first fixing members are fixed to the first screw columns by screws.

9. The smart mirror according to claim 6, wherein the HDMI female is provided with three second fixing members at outer sides; the second fixing members are provided with second screw holes to cooperate with the second screw columns at inner side of the rear case, and the second fixing members are fixed to the second screw columns by screws.

10. The smart mirror according to claim 4, wherein the mirror body further comprises: an HDMI adapter in signal connection with the display component, and a second cable; wherein the HDMI adapter is provided with an HDMI plug;
one end of the second cable is the HDMI female;
the other end of the second cable is an HDMI plug to be plugged into the HDMI adapter; and
the second cable further comprises a first lead configured to connect the HDMI female and the HDMI plug.

11. The smart mirror according to claim 10, wherein the mirror body further comprises a strip light component; and
the second cable further comprises a first connector to be plugged into a control board of the strip light component, and a second lead configured to connect the first connector and the HDMI female.

12. The smart mirror according to claim 11, wherein the strip light component is a ring frame structure arranged outside the display component, and the display component is in a central area of the mirror body.

13. The smart mirror according to claim 12, wherein the mirror body further comprises a camera component; and
the second cable further comprises: a second connector in signal connection with the camera component, and a third lead configured to connect the second connector and the HDMI female.

14. The smart mirror of claim 13, wherein the camera component is arranged in an area between the display component and the strip light component.

15. The smart mirror according to claim 14, wherein the camera component is arranged above the display component, and is spaced from the display component and the strip light component by a set distance.

16. The smart mirror according to claim 13, wherein the mirror body further comprises a power component, and the power component is in signal connection with the display component, the HDMI adapter, the strip light component and the camera component respectively;
the second cable further comprises: a third connector in signal connection with the power component, and a fourth lead configured to connect the third connector and the HDMI female.

17. The smart mirror of claim 16, wherein the mirror body further comprises an external power socket, and the external power socket is in signal connection with the power component.

18. The smart mirror of claim 17, wherein the rear case of the mirror body is provided with a second opening, and the external power socket is fixed to the outer side of the rear case through the second opening.

19. The smart mirror of claim 1, wherein the mirror body and the touch display screen are respectively provided with wireless interfaces, and the wireless interface on the mirror body is in signal connection with the display component and configured for wireless communication with the touch display screen.

20. The smart mirror of claim 1, wherein
the mirror body is provided with a first data interface;
the touch display screen is provided with a second data interface;
wherein the first data interface and the second data interface are different in type.

* * * * *